Nov. 7, 1933.  G. BARSKY  1,934,161
METHOD OF PRODUCING ACETIC ACID
Filed July 22, 1930
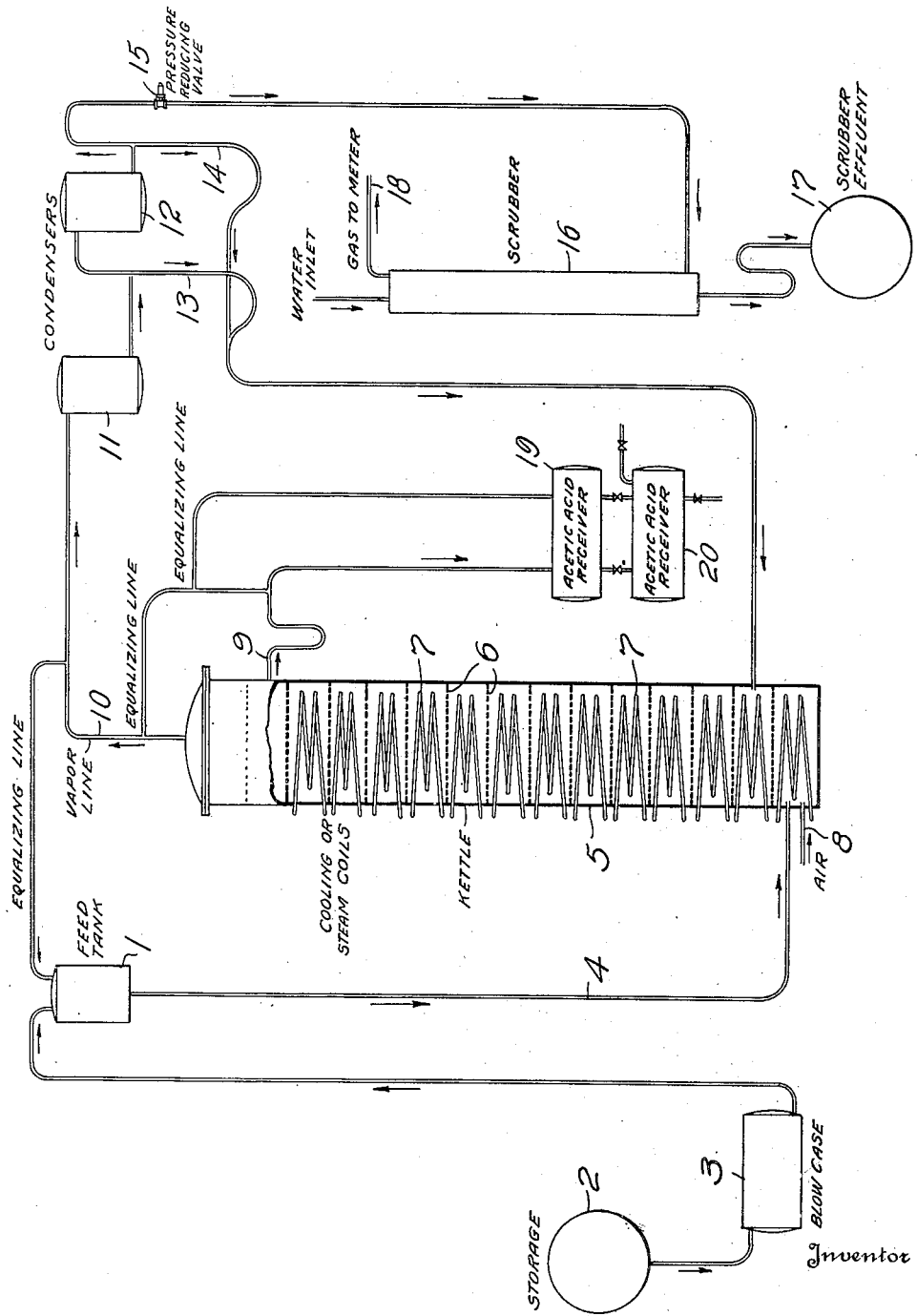
Inventor
GEORGE BARSKY,
By  [signature]
Attorney Patented Nov. 7, 1933

1,934,161

UNITED STATES PATENT OFFICE 1,934,161

METHOD OF PRODUCING ACETIC ACID

George Barsky, New York, N. Y., assignor to American Cyanamid Company, New York, N. Y., a corporation of Maine Application July 22, 1930. Serial No. 469,730

9 Claims. (Cl. 260—116)

The present invention relates to the continuous manufacture of acetic acid from acetaldehyde by the oxidation thereof such as by means of a gas containing free oxygen, and is particularly concerned with a system which will produce and deliver continuously substantially acetaldehyde-free acetic acid.

The principal object of the invention is the provision of a method whereby the above reaction may be carried out expeditiously with maximum production of acetic acid continuously while minimizing the dangers from over-oxidation and explosion, and in an apparatus which will be simple and cheap to construct and which requires a minimum amount of attention.

In carrying out the invention, I conduct liquid acetaldehyde, preferably with a catalyst, such as manganese acetate, and an oxidizing gas, such as air, to the bottom of a reaction kettle containing either acetaldehyde or a mixture of acetaldehyde and acetic acid. Means are provided within the reaction kettle for causing turbulence of the reactants as they pass upwardly through the kettle and at the same time prevent back passage of liquid. Maximum concentrations of acetic acid occur toward the top of the kettle and this zone of the apparatus is maintained at such a temperature that any free acetaldehyde in the thus produced acetic acid will be vaporized and carried off to condensers which return the condensate to the bottom of the chamber for further reaction. The substantially acetaldehyde-free acetic acid is removed from this zone automatically and substantially continuously, for storage or further treatment as desired.

The figure in the drawing shows diagrammatically a flow sheet for carrying out the method of this invention.

Referring now to the drawing, there is shown a feed tank 1 for acetaldehyde, preferably liquid, to which may also be added a catalyst such as manganese acetate. The feed tank 1 is kept supplied with the reactant from the storage tank 2 through the intermediary blow case 3 and connecting supply tank. The above reactants drop from the feed tank through the pipe 4 into the bottom of the reaction kettle 5, which here is shown to consist of a tower containing a series of horizontal perforated plates 6 forming in effect chambers therebetween, each chamber being provided with coils 7, through which cooling water or heating steam may be conducted at will and independently of any other chamber.

An oxidizing gas such as air, or the like, is introduced under pressure through the pipe 8 also into the bottom of the reaction kettle 5, which may be filled to the desired level, either with liquid acetaldehyde or acetaldehyde and acetic acid as desired. The introduced acetaldehyde and air pass upwardly through the kettle and through the perforations in the dividing plates 6 with considerable turbulence, thus effecting a thorough mixing of the oxidizing gas with acetaldehyde and at the same time reducing back or reverse movement of liquid within the kettle to a minimum. It has been found desirable to maintain a pressure of substantially 75 lbs. per sq. in. within the reaction kettle, and a temperature of from 60° to 80° C. As the composition of the charge in the kettle will vary as oxidation proceeds from bottom to top, it may be found necessary to apply either cooling water or heating steam, as needed, to the various compartments.

As oxidation progresses, it will be found that the greatest concentration of acetic acid occurs at or near the top of the kettle and it is at this point that the produced acetic acid automatically overflows as through the take-off 9. The temperature of the liquid within the reaction kettle in this zone is controlled so that an acetaldehyde vaporizing temperature exists there. This temperature insures the boiling out of any free acetaldehyde contained within the produced acetic acid, with the result that the acetic acid passing out of the kettle at 9 is substantially acetaldehyde-free. This vaporized acetaldehyde, together with excess air and other gaseous products, passes out of the kettle through the vapor line 10 to condensers 11 and 12, the condensate being returned through the lines 13 and 14 to the bottom of the kettle for further reaction. The uncondensed gases from the last condenser 12 pass through the pressure reducing valve 15, which may be used to regulate the pressure within the kettle, to the bottom of a scrubber 16, through which water flows in a countercurrent manner, the effluent being caught in the container 17. The scrubber gases are vented at 18 after passing through a meter.

The substantially acetaldehyde-free acetic acid drops from the pipe 9 into the receivers 19 and 20 from which it may be removed to a rectifying apparatus or otherwise as desired. Various equalizing lines may be supplied as between the vapor line 10 and feed tank 1; between the acetic acid take-off 9 and vapor line 10; and between the acetic acid receiver 19 and the vapor line, all of which is well-known.

From the above, it will be apparent that this system is particularly efficient in that acetic acid may be continuously produced by the reaction between acetaldehyde and oxygen under controlled conditions of temperature and pressure. The concentration of acetic acid being greatest at the top of the kettle, removal of acetaldehyde contained therein in that zone not only makes available the thus removed acetaldehyde for further reaction, but makes unnecessary the treatment of the acetic acid subsequently to remove this acetaldehyde, the entire reaction and acetaldehyde removal proceeding smoothly and with minimum difficulties.

As a catalyst, I have found manganese acetate to be very satisfactory when introduced simultaneously with other reactants and to be present within the kettle charge in a concentration up to 1%.

While the invention has been shown and described with particular reference to a method of producing acetic acid and specifies certain temperatures and pressures, yet obviously I do not wish to be limited strictly thereto but the invention is to be construed broadly and limited only by the scope of the claims.

I claim:

1. A continuous method of producing acetic acid which includes the steps of continuously flowing liquid acetaldehyde and an oxidizing gas upwardly through a reaction kettle, maintaining the reaction zone under super-atmospheric pressure maintaining the top of the kettle at a temperature sufficient to remove acetaldehyde from the produced acetic acid, removing the said acetaldehyde from the kettle, condensing and returning the same to the bottom of the kettle, and continuously removing the acetic acid formed.

2. A continuous method of producing acetic acid which includes the steps of continuously flowing liquid acetaldehyde and an oxidizing gas upwardly through a reaction kettle, maintaining the reaction zone under super-atmospheric pressure maintaining the top of the kettle at a temperature sufficient to remove acetaldehyde from the produced acetic acid, removing the said acetaldehyde from the kettle, condensing and returning the same to the bottom of the kettle, and continuously removing the acetic acid formed from the acetaldehyde removal zone.

3. A continuous method of producing acetic acid which includes the steps of continuously flowing liquid acetaldehyde and an oxidizing gas upwardly through a reaction kettle containing acetaldehyde and acetic acid, maintaining the reaction zone under super-atmospheric pressure continuously removing the formed acetic acid from the kettle at the zone of its greatest concentration, and continuously removing the free acetaldehyde from the same zone.

4. A continuous method of producing acetic acid which includes the steps of continuously flowing liquid acetaldehyde and an oxidizing gas through a reaction kettle in the same direction, maintaining turbulence between the acetaldehyde and the gas within the kettle, and the kettle under super-atmospheric pressure with minimum reverse flow of liquid therein, passing the reactants and reaction products through a heat zone sufficient to vaporize any acetaldehyde in said zone, and removing from that zone said acetaldehyde and acetic acid.

5. A continuous method of producing acetic acid which includes the steps of continuously flowing liquid acetaldehyde and an oxidizing gas through a reaction kettle in the same direction, maintaining turbulence between the acetaldehyde and the gas within the kettle, and the kettle under super-atmospheric pressure with minimum reverse flow of liquid therein, passing the reactants and reaction products through a heat zone sufficient to vaporize any acetaldehyde in said zone, and removing from that zone said acetaldehyde and acetic acid separately.

6. A continuous method of producing acetic acid which includes the steps of continuously flowing liquid acetaldehyde and an oxidizing gas through a reaction kettle in the same direction, maintaining the temperature of the kettle between 60° C. and 80° C. and its pressure at super-atmospheric and continuously removing the acetic acid formed.

7. A continuous method of producing acetic acid which includes the steps of continuously flowing liquid acetaldehyde and an oxidizing gas through a reaction kettle in the same direction, maintaining the temperature of the kettle below 80° C. and under substantially 75 lbs. per sq. in., and continuously removing the acetic acid formed.

8. A continuous method of producing acetic acid which includes the steps of continuously flowing liquid acetaldehyde and an oxidizing gas upwardly through a reaction kettle containing liquid acetaldehyde and acetic acid, maintaining the kettle under super-atmospheric pressure applying heat to the liquid within the kettle at a zone containing the greatest concentration of acetic acid, vaporizing and removing acetaldehyde from the acetic acid in that zone, and continuously removing the acetaldehyde-free acetic acid therefrom.

9. A continuous method of producing acetic acid which includes the steps of continuously flowing liquid acetaldehyde and an oxidizing gas through a reaction kettle to form acetic acid, maintaining a zone within the reaction kettle at such a temperature and super-atmospheric pressure that acetaldehyde therein will be vaporized, continuously removing the said acetalrehyde from the zone, and continuously removing the acetaldehyde-free acetic acid from said zone.

GEORGE BARSKY.